US012760517B2

(12) United States Patent
Huang et al.

(10) Patent No.: US 12,760,517 B2
(45) Date of Patent: Oct. 13, 2026

(54) REINFORCEMENT MESH AND METHOD FOR PRODUCING THEREOF

(71) Applicant: CRT MANUFACTURING SDN. BHD., Kota Kemuning (MY)

(72) Inventors: Mei Si Huang, Kota Kemuning (MY); Hon Wai Cheong, Kota Kemuning (MY)

(73) Assignee: CRT MANUFACTURING SDN. BHD., Kota Kemuning (MY)

( * ) Notice: Subject to any disclaimer, the term of this patent is extended or adjusted under 35 U.S.C. 154(b) by 76 days.

(21) Appl. No.: 18/016,429

(22) PCT Filed: Jul. 15, 2021

(86) PCT No.: PCT/MY2021/050061
§ 371 (c)(1),
(2) Date: Jan. 16, 2023

(87) PCT Pub. No.: WO2022/015157
PCT Pub. Date: Jan. 20, 2022

(65) Prior Publication Data
US 2023/0332405 A1 Oct. 19, 2023

(30) Foreign Application Priority Data
Jul. 17, 2020 (MY) ............................ PI2020003715

(51) Int. Cl.
*E04C 5/07* (2006.01)
*C09J 5/06* (2006.01)
(Continued)

(52) U.S. Cl.
CPC .................. *E04C 5/07* (2013.01); *C09J 5/06* (2013.01); *D07B 1/02* (2013.01); *D07B 5/00* (2013.01);
(Continued)

(58) Field of Classification Search
CPC ... E04C 5/012; E04C 5/04; E04C 5/07; E04C 5/085; E04C 5/162; E04C 5/66; E04C 5/167; E04C 2/06; E04F 13/047
(Continued)

(56) References Cited

U.S. PATENT DOCUMENTS 1,491,364 A * 4/1924 John ........................ E04H 17/05 245/8
2,312,293 A * 2/1943 Weiss ........................ E04C 5/04 428/140
(Continued)

FOREIGN PATENT DOCUMENTS

JP H08218552 8/1996
JP 2000073379 3/2000
(Continued)

OTHER PUBLICATIONS

International Search Report Dated Oct. 15, 2021.
(Continued)

*Primary Examiner* — Ryan D Kwiecinski
(74) *Attorney, Agent, or Firm* — Patentbest; Andrew McAleavey

(57) ABSTRACT

The present invention relates to a reinforcement mesh (1) for use in construction, the mesh (1) comprising a plurality of longitudinally and transversely extending reinforcing members (2), wherein either of the longitudinal or the transverse reinforcing members (2), each comprises a rebar comprising strands (3) of material twisted together, the strands being parted at spaced locations along their length by the other of the longitudinal or transverse rebars which extend through, and are secured at, the spaced locations of the parted strands (4). The present invention also relates to a method for producing a reinforcement mesh (1) for use in construction

7 Claims, 3 Drawing Sheets

(51) Int. Cl.

| | |
|---|---|
| ***D07B 1/02*** | (2006.01) |
| ***D07B 5/00*** | (2006.01) |
| ***E04C 5/04*** | (2006.01) |
| ***E04C 5/16*** | (2006.01) |

(52) U.S. Cl.
CPC ......... *E04C 5/166* (2013.01); *C09J 2400/146* (2013.01); *C09J 2400/166* (2013.01); *D07B 2201/104* (2013.01); *D07B 2201/2009* (2013.01); *D07B 2205/3003* (2013.01); *D07B 2501/2023* (2013.01)

(58) Field of Classification Search
USPC .......... 52/309.16, 309.17, 660, 454; 442/180
See application file for complete search history.

(56) References Cited

U.S. PATENT DOCUMENTS

| | | | | | |
|---|---|---|---|---|---|
| 3,522,685 | A * | 8/1970 | Georgi | E04C 5/04 52/432 |
| 4,894,276 | A * | 1/1990 | Bryant | D06B 15/085 139/50 |
| 5,552,207 | A * | 9/1996 | Porter | D03D 15/267 442/3 |
| 6,263,629 | B1 | 7/2001 | Brown, Jr. | |
| 6,368,024 | B2 * | 4/2002 | Kittson | D04B 1/00 428/98 |
| 6,632,309 | B1 * | 10/2003 | Hendrix | E01C 11/16 156/205 |
| D817,648 | S * | 5/2018 | Wu | D5/2 |
| 10,815,151 | B2 * | 10/2020 | Bruske | B29C 66/52651 |
| 11,466,456 | B2 * | 10/2022 | Kim | D06M 15/705 |
| 2005/0144901 | A1 * | 7/2005 | Egan | E04F 13/04 52/782.1 |
| 2009/0031656 | A1 * | 2/2009 | Hunt-Hansen | E04F 13/047 52/746.1 |
| 2009/0263572 | A1 * | 10/2009 | Wheatley | D04B 21/10 427/136 |
| 2019/0002345 | A1 * | 1/2019 | Bruske | B29C 66/8322 |
| 2019/0316347 | A1 * | 10/2019 | Scott | D03D 1/0035 |
| 2020/0032514 | A1 * | 1/2020 | Kim | D03D 25/005 |
| 2023/0228085 | A1 * | 7/2023 | Blackburn | B28B 23/0006 442/42 |

FOREIGN PATENT DOCUMENTS

| | | | | | |
|---|---|---|---|---|---|
| JP | 2014511951 | | | 5/2014 | |
| JP | 2021139077 | A | * | 9/2021 | |
| KR | 101109606 | B1 | * | 2/2012 | E02D 17/20 |
| KR | 101160937 | B1 | * | 7/2012 | E06B 9/262 |
| KR | 101186506 | B1 | * | 10/2012 | D06M 15/227 |
| KR | 101276490 | B1 | * | 6/2013 | E02D 29/02 |
| KR | 101851903 | B1 | * | 4/2018 | D04B 1/22 |
| KR | 20190140149 | A | * | 12/2019 | D02G 3/18 |
| KR | 102102435 | | | 4/2020 | |
| KR | 102112960 | | | 5/2020 | |
| KR | 102112960 | B1 | * | 5/2020 | B29C 70/52 |
| WO | WO-9806570 | A1 | * | 2/1998 | D03D 15/283 |
| WO | WO-2014161944 | A1 | * | 10/2014 | D03D 19/00 |
| WO | WO-2016050421 | A1 | * | 4/2016 | E04C 5/017 |
| WO | 2018021230 | | | 2/2018 | |
| WO | WO-2018021230 | A1 | * | 2/2018 | D03D 15/00 |
| WO | WO-2023137259 | A1 | * | 7/2023 | E04C 5/07 |

OTHER PUBLICATIONS

Written Opinion of International Searching Authority Dated Oct. 15, 2021.
Written International Preliminary Report On Patetnability Dated Jun. 17, 2022.
English Abstract of JP2014511951.
English Abstract of JP2000073379.
English Abstract of KR102112960.
English Abstract of JPH08218552.
English Abstract of KR102102435.

* cited by examiner

REINFORCEMENT MESH AND METHOD FOR PRODUCING THEREOF

CROSS-REFERENCE TO RELATED APPLICATION

The instant application is a national phase of PCT International Application No. PCT/MY2021/050061 filed Jul. 15, 2021, and claims priority to Malaysian Patent Application Serial No. PI2020003715 filed Jul. 17, 2020, the entire specifications of both of which are expressly incorporated herein by reference.

FIELD OF INVENTION

The present invention generally relates to a mesh reinforcement for reinforced-concrete structures or masonries and a method for producing thereof.

BACKGROUND OF THE INVENTION

Building structures and masonries constructed of concrete or cementitious materials often require strong reinforcement in their construction. Concrete or cementitious materials are brittle in tension but relatively tough in compression. In technical terms, they possess low tensile strength yet have good compressive strength. As such, reinforcement is often employed to impart the necessary tensile strength when concrete is used as a structural member, for example, in a bridge, building or the like. Reinforcement has been undertaken with various steel shapes such as open steel meshes, steel reinforcing bars and steel grids in the construction of concrete structures such as precast driveways, slabs and sidewalks. Conventionally, steel meshes have been utilised in the reinforcement of concrete structures. These steel meshes are opened cell structure, and each section of the steel mesh contains and confines a rectangular or square perimeter of concrete. As such, crack control, impact resistance and toughness of the concrete structures can be achieved due to the close spacing and uniform distribution of reinforcement within the concrete structures. However, these types of meshes are inherently very inefficient in their use of reinforcement.

Steel and other types of metals used to form structural reinforcements are undesirably subjected to corrosion. The by-products of corrosion may result in the expansion of the columns of the steel which creates a 'spalling' effect whereby the concrete structures breakup into fragments and deteriorate over time. The breaking and crumbling of concrete structures is significantly severe in locations of high humidity. Furthermore, configurations requiring a minimum of at least one inch or more of a "cover" are typically provided due to the potential for spalling of the concrete structures. As such, the steel reinforcing members are spaced apart from the surface of the concrete and may require the design thickness of concrete panels to be within a certain minimum thickness of about 3 inches to permit for the thickness of the steel reinforcing member and about one inch or so of concrete n either side of the reinforcing member. One example of a conventional reinforcement mesh is readily disclosed in Japan Patent Publication No. JP2000073379A whereby a plurality of sheet-like welded metallic nets or meshes are formed by welding reinforcement parts extending in the longitudinal and transverse directions in a lattice arrangement. The aforementioned technology reflects a particularly traditional technique of forming a reinforcement mesh and over time results in the "spalling" effect due to corrosion of the metallic reinforcement parts used therein.

As a substitution for conventional steel in reinforcing concrete structures, various types of plastics have been considered. Particularly, fiberglass composite rebars have been developed for reinforcing concrete structures such as walls and floors of X-ray rooms in hospitals which metallic forms of reinforcement are strictly not permitted. An exemplary technology of a reinforcing gridwork employing glass fibers is disclosed in United States of America Patent Publication No. US6263629B1. Therein, a reinforcing structural member in the form of a grid is formed of a hardenable structural material that includes a first type of fiber comprising carbon fibers and a second type of fiber comprising glass fibers such that the reinforcing grid is comprised of a set of warp strands formed from the first or second type of fibers and a set of weft strands disposed at substantially right angles to the set of warp strands formed of the first or second types of fibers whereby the grid is partially formed of fibers of the first type which will continue to reinforce the hardened material in the event the fibers of the second type become corroded in the hardened material. Essentially, the reinforcing grid in the aforementioned can be molded into desired shapes to allow fiberglass rebars to be placed in some of the grooves and thereby forming a reinforcement foundation. Despite the cleverness, such technology is troublesome and may require an extended curing time for the first or second type of fibers to corrode in order to become the hardenable material. A further establishment of a method to realise a reinforcing structure is disclosed in Japan Patent Publication No. JP2014511951A whereby a reinforcing reinforcement of composite elements with mineral or base matrix of resin consists of a reinforcement structure associated by textile weaves. Particularly as described in the technology, the reinforcing structure may be composed of woven lattices and combines the "entangled" Leno texture with a plain woven or taffeta textured rod passage between the yarns. Essentially, such weaving of the woven lattices around the rods is low in stiffness and may not be strong enough to realise a reinforcement mesh.

As such, there is a need to provide a reinforcement mesh for use in construction, particularly without the need for a welding process. Partings may be employed on the twisted strands of which reinforcing bars are formed from so that reinforcing bars can be guided through to essentially form a reinforcement mesh. The invention provides such a solution.

SUMMARY OF INVENTION

One aspect of the invention is to provide a reinforcement mesh for use in construction. Particularly, the reinforcement mesh is comprised of a plurality of either longitudinal or transverse rebars which are extended through partings of another longitudinal or transverse rebars preformed as strands twisted together. Advantageously, the fabrication of the reinforcement mesh does not require heat welding to join the rebars together as the rebars are strategically gripped at the partings to form the joints.

Another aspect of the invention is to provide a method for producing the reinforcement mesh for use in construction as aforementioned.

At least one of the preceding objects is met, in whole or in part, in which the embodiment of the invention describes a reinforcement mesh for use in construction, the mesh comprising a plurality of longitudinally and transversely extending reinforcing members, wherein either of the longitudinal or the transverse reinforcing members, each comprises a rebar comprising strands of material twisted together, the strands being parted at spaced locations along their length by the other of the longitudinal or transverse rebars which extend through, and are secured at, the spaced locations of the parted strands.

In a preferred embodiment of the invention, it is disclosed that the twisted strands comprise fibrous material made from fiberglass.

In another preferred embodiment of the invention, it is disclosed that the said other of the longitudinal or transverse reinforcing members are rebars formed from fiberglass.

Further embodiment of the invention discloses that the longitudinal and transverse reinforcing members are fused together at the spaced locations of the parted strands.

In an exemplary embodiment of the invention, there is disclosed a method for producing a reinforcement mesh for use in construction, the method comprising the steps of providing a plurality of reinforcing members extending longitudinally or transversely and arranged in a spaced-apart manner, providing a plurality of supporting members, each supporting member formed from strands of material extending across the reinforcing members and arranged in a spaced-apart manner, twisting the strands of material so that partings between the strands are provided at predetermined locations along the length of each supporting member, guiding each reinforcing member through respective ones of the plurality of partings and fusing each reinforcing member to each supporting member at the partings between the strands to form a reinforcement mesh.

Preferably, the longitudinal or transverse reinforcing members are rebars formed from fiberglass.

More preferably, the twisted strands comprise fibrous material made from fiberglass.

It is preferred that the step of fusing is performed by impregnating substantially throughout with a thermosettable adhesive mixture so as to secure the plurality of reinforcing members at the partings between the strands of the supporting members and maintain the reinforcement mesh in a semi-flexible state.

It is also preferred that the step of fusing is performed by impregnating substantially throughout with a fully cured thermoset adhesive mixture so as to secure the plurality of reinforcing members at the partings between the strands of the supporting members and maintain the reinforcement mesh in a relatively rigid state.

One skilled in the art will readily appreciate that the present invention is well adapted to carry out the objects and obtain the ends and advantages mentioned, as well as those inherent therein. The embodiment described herein is not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

Hereinafter, the invention shall be described according to the preferred embodiments of the present invention and by referring to the accompanying description and drawings. However, it is to be understood that limiting the description to the preferred embodiments of the invention is merely to facilitate discussion of the present invention and it is envisioned that those skilled in the art may devise various modifications without departing from the scope of the appended claim.

The invention will now be described in greater detail with reference to the drawings.

Figure 1:
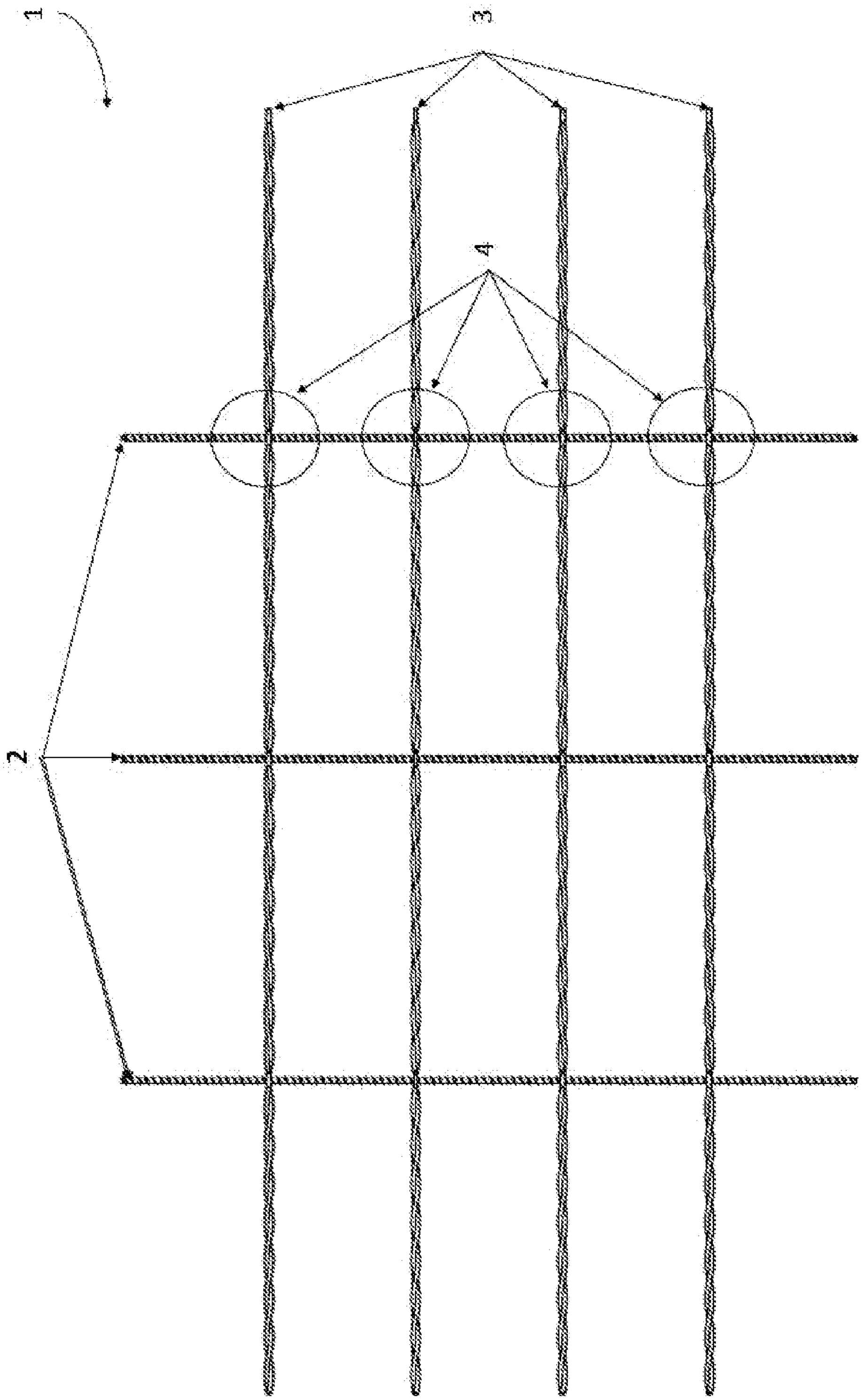
FIG. 1 illustrates a perspective view of a reinforcement mesh as embodied in the invention.
Figure 2:
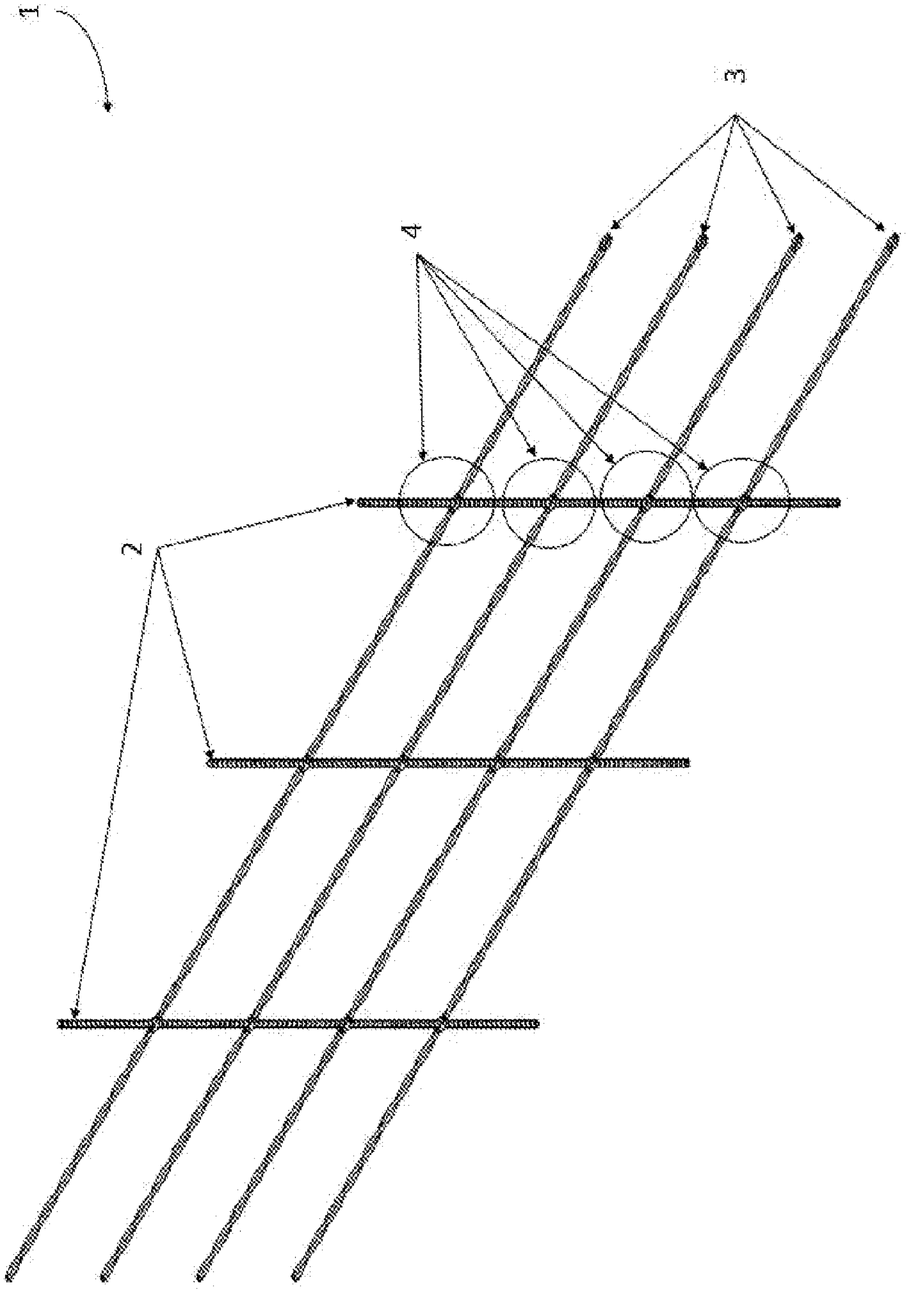
FIG. 2 illustrates an isometric view of a reinforcement mesh as embodied in the invention.

Referring to the drawings in particular, the invention embodied in FIGS. 1 and 2 comprises a reinforcement mesh suitable for use in construction, the reinforcement mesh generally designated 1. This reinforcement mesh 1 of the invention can be used to reinforce products such as buildings or masonries formed of a hardenable structural material, such as concrete or asphalt, by placing the reinforcement mesh 1 in the hardenable material before hardening of the material. The reinforcement mesh 1 may be in the form of a lattice or gridwork comprising a plurality of longitudinally and transversely reinforcing members 2.

For the purpose of illustration in FIGS. 1 and 2, either of the longitudinally or transversely reinforcing members 2 may be disposed at substantially right angles to each other and thereby realising the lattice or gridwork form of the reinforcement mesh 1. According to a preferred embodiment of the invention, either of the longitudinally or transversely extending reinforcing member 2 may be a rebar. Preferably, the rebar of the reinforcing member 2 may be prefabricated essentially of strands of material twisted together. It is to be appreciated that other types of materials, which can be selected to fabricate the rebar of the reinforcing member 2 such as stainless steel or carbon steel coated with epoxy resin, or composite material such as carbon, aramid, nylon or basalt fibers could be adapted for use in this invention by providing suitable material fusion system. However for the specificity of this invention, the rebar of the reinforcing member 2 for fabricating the reinforcement mesh 1 is comprised and formed of fibrous material made from fiberglass. Preferably, the rebar is prefabricated of a plurality of continuous strands of fiberglass twisted together in a mono-, bi- or multidirectional configuration.

Figure 3:
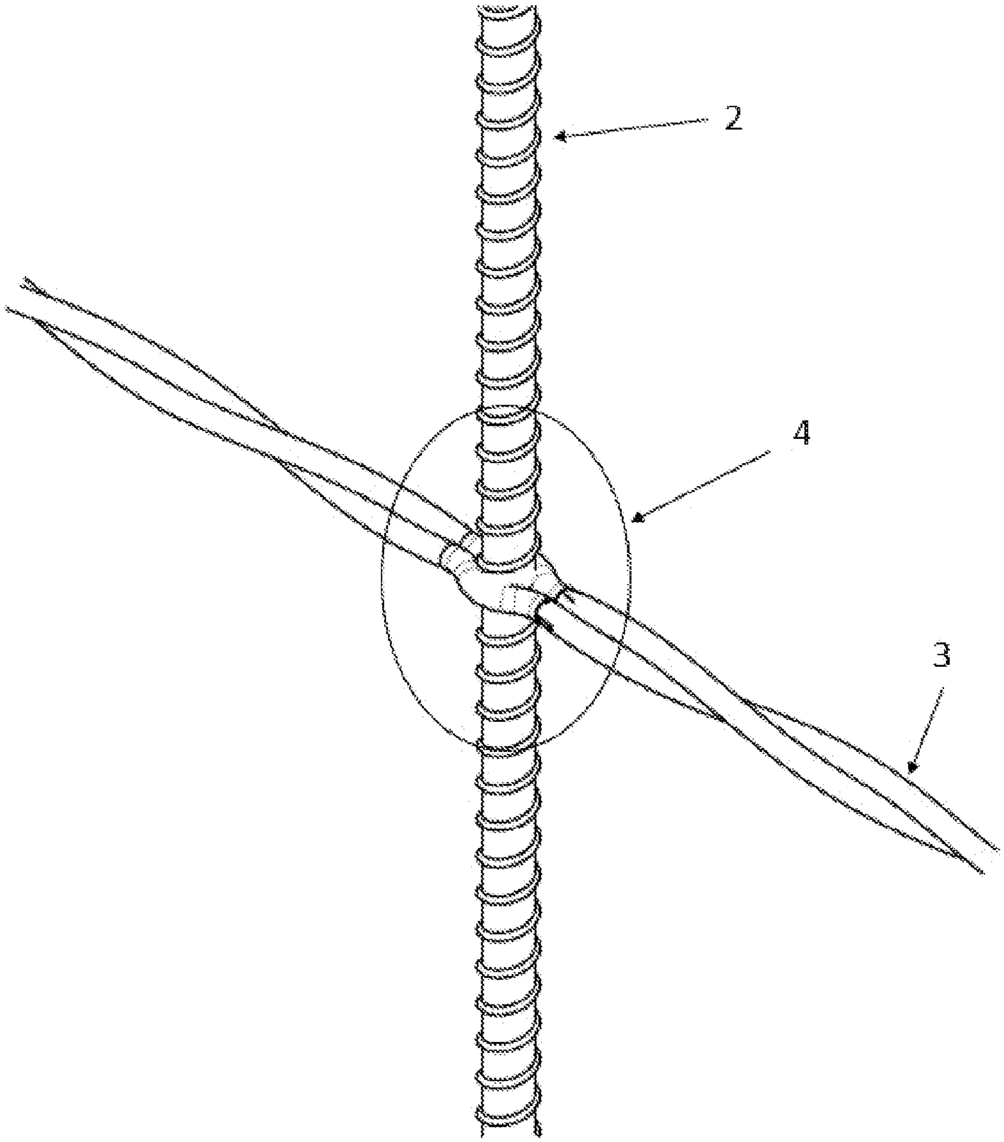
FIG. 3 illustrates an enlarged isometric view of a reinforcement mesh as embodied in the invention.

Making reference to FIGS. 1 and 2, a preferred embodiment of the invention also recites that either of longitudinally or transversely reinforcing members 2 may also comprise a plurality of strands 3 twisted together to essentially form a support component of the reinforcement mesh 1. Preferably, the twisted strands 3 are being parted at spaced locations along their length. Such parting of the strands 3 may be configured by means of the other of the longitudinal or transverse rebars extending through the spaced locations of the plurality of twisted strands 3 as shown in FIG. 3. It is preferred that the parting of the twisted strands 3 are commenced simultaneously or in sequence by the extending other of the longitudinal or transverse rebars therethrough to form the aforementioned lattice or gridwork form of the reinforcement mesh 1. Essentially, the spaced locations of the strands 3 form partings 4 along the length thereof whereby the longitudinal or transverse rebars are secured thereat. In order to permit partings of the twisted strands 3, the twisted strands 3 are preferably comprised of fibrous material made from fiberglass due to its substantial formability.

It is to be understood that glass fibers are not as strong as other conventional materials such as stainless steel or other composite material such as carbon fibers as glass fibers may be subjected to alkaline attack and corrosion from the concrete material. In fact, glass fibers in concrete structures have found to break up and lose all of the original strength of the fibers over a period of several years. However, glass fibers are significantly less expensive and lighter as compared to conventional materials to realise a reinforcement mesh 1 of the invention. In particular, the glass fibers of the reinforcing members 2 can serve a reinforcing function despite possible alkaline attack upon being surrounded by the concrete or during subsequent hardening process of the concrete, provided that the reinforcing members are properly treated. For example, the performance of the reinforcing members 2 particularly comprised of fiber glass may be optimized by sizing them with a coating of silane which has been proven to help resist the effects of alkali attack. The glass fiber of the rebar of the reinforcing members 2 and twisted strands 3 may also be alternatively or additionally coated with rubber latex or the like to minimize corrosion of the glass fibers. To fit into the context of the invention, a preferred embodiment of the invention provides a teaching that the longitudinal or transverse reinforcing members 2, in particular the rebars are fused together at the spaced locations of the parted strands 3. Essentially, the abovementioned treatment of the glass fibers of the reinforcing members 2 utilising chemical coatings such as thermosettable adhesive mixture can practically promote fusion of the longitudinal or transverse reinforcing members 2 at the partings 4 of the twisted strands 3 to form the reinforcement mesh 1 of the invention. This is particularly workable as both the longitudinal or transverse reinforcing members 2 and twisted strands 3 are composed of a fibrous material of glass fiber. It is of an added advantage that the treatment of the glass fiber-based reinforcing members 2 with a thermosettable adhesive mixture for example, may commence a chemical reaction between the longitudinal or transverse reinforcing members 2 with the twisted strands 3, thereby chemically fusing them together to form the reinforcement mesh 1 of the invention.

The reinforcement mesh 1 as exemplified in the invention is comprised of a plurality of reinforcing members 2 as embodied in FIGS. 1 and 2. Particularly, the reinforcement mesh 1 may be fabricated by firstly providing a plurality of reinforcing members 2 which are preferably configured to extend longitudinally or transversely depending on the desired arrangement. According to an embodiment of the invention, the reinforcing component of the reinforcing member 2 is essentially a prefabricated rebar formed from a fibrous material of fiberglass. It is preferred that each rebar of the reinforcing member 2 is arranged alternately to each other and in a spaced-apart manner.

Following the step of providing the plurality of reinforcing members 2 in their desired arrangement, the next step of providing a plurality of supporting member is commenced. Particularly in the context of this invention, the term "supporting member" is generally referred to the strands of material 3 employed with their purpose of supporting the reinforcing members 2. A preferred embodiment of the invention recites that the supporting members are formed from strands of material 3 extending across either longitudinally or transversely relative to the arrangement of the reinforcing members 2. Preferably, the strands 3 for forming the supporting members of the reinforcement mesh 1 are comprised of a fibrous material made from fiberglass. It is preferred that the each of the supporting member formed from strands of material 3 are arranged alternately to each other and in a spaced-apart manner. As such, the plurality of reinforcing members 2 are essentially disposed at substantially right angles to the strands of material 3 to form the necessary lattice or gridwork form for the reinforcement mesh 1.

Accordingly, because the prefabricated rebars of the reinforcing members 2 are much stronger than the glass fiber strands 3, the glass fiber strands 3 may function primarily to tie and secure the rebars of the reinforcing members 2 in place. As such, a step of twisting the glass fiber strands 3 is followed so that partings 4 between the strands 3 are provided at predetermined locations along the length of each twisted strands 3. The partings 4 between the twisted strands 3 may be provided mechanically by means of a machine known in the art. Alternatively, the partings 4 between the twisted strands 3 may be provided at predetermined locations manually by a human operator, if desired. Preferably, the glass fiber strands 3 are twisted in a unidirectional orientation so that each glass fiber strand 3 is twisted simultaneously in either a single right- or left-hand direction crossing as exemplified in FIG. 3. Alternatively, the glass fiber strands 3 may be twisted in a bidirectional orientation so that each glass fiber strand 3 is twisted simultaneously in either of two opposite directions. It is to be appreciated that the unidirectional or bidirectional twisting orientation of the strands 3 is suitably applicable in the case when a pair of strands 3 are employed in fabricating the supporting member of the reinforcement mesh 1, as exemplified in FIG. 3. A multidirectional orientation for twisting a multiplicity of strands 4 may be considered if desired.

Once the plurality of partings 4 are provided at predetermined locations along the length of the supporting member of the reinforcement mesh 1, each of the plurality of reinforcing members 2 in the form of a rebar is strategically guided, simultaneously or in sequence, through the respective ones of the plurality of partings 4 of the each of the plurality of twisted strands 3 and secured thereat. Accordingly, a step of fusing each reinforcing member 2 to each supporting member at the partings 4 between the twisted strands 3 is commenced. The aforementioned step is an essential step to practically realise the lattice or gridwork form of the reinforcement mesh 1 of the invention having opened structures of various shapes including square or rectangular; FIGS. 1 and 2 particularly illustrate a rectangular opening. Ideally, the reinforcement mesh 1 at its preliminary stage may be impregnated substantially throughout with a thermosettable adhesive mixture so as to interlock the twisted strands 3 at the partings 4 with the reinforcing members 2 and maintain the reinforcement mesh 1 in a semi-flexible state which permits the reinforcement mesh 1 to conform to the shape of the product to be reinforced. For example, the reinforcement mesh 1 may be designed to be incorporated into a finished product such that the reinforcing members 2 and the twisted strands 3 of the reinforcement mesh 1 is conformed to the shape or the functionality of the end-use product and then further cured to form a structural composite. The ability of the reinforcement mesh 1 to be conformed to the shape of the product permits the reinforcing members 2 and the twisted stands 3 to be treated or cured by the inherent heat that is operatively applied or generated in the final construction of the finished product. As an example, when the reinforcement mesh 1 is incorporated during laying of hot bitumen in paving roads or roofing systems, the thermosettable adhesive mixture impregnated into the reinforcement mesh 1 would be cured by the predetermined heat of the hot bitumen used in the processes. Alternatively, an external heat may be applied directly to cure or partially cure the reinforcement mesh 1 before incorporation into concrete structure, if desired.

Impregnating the reinforcement mesh 1 with a thermosettable adhesive mixture permits the reinforcement mesh 1 to be semi-flexible and conform to the desired shape of the product to be reinforced, particularly upon subjected to heat. Once the reinforcement mesh 1 is conformed to the shape of the product to be reinforced, the adhesive mixture is cured to a thermoset state thereby providing, upon sufficient cooling, added rigidity and enhanced properties to the end product. The impregnated reinforcement mesh 1 provides an added advantage such that it can be conformed to any shape readily available to the product desired to be reinforced and can further be cured in situ using the heat inherently available in the conventional manufacturing process, for example the heated bitumen concrete in bitumen roadway construction. Furthermore, the reinforcement mesh 1 may be cured by heat subjected externally which could potentially cure the reinforcement mesh 1 to a rigid state prior to incorporation into a finished product or supplemental heat can be provided following incorporation in the finished product, if desired. Essentially, the reinforcement mesh 1 is relatively rigid upon fully cured. Such a rigid reinforcement mesh 1 as embodied in the invention would be structurally composed of the same reinforcing members 2 and twisted strands 3 configurations and compositions as the flat reinforcement mesh 1 impregnated with the thermosettable adhesive mixture, except that the thermosettable adhesive mixture has been advanced to a fully cured thermoset adhesive mixture. The resulting rigid state of the reinforcement mesh 1 provides added reinforcement to the product to be reinforced.

The present disclosure includes as contained in the appended claims, as well as that of the foregoing description. Although this invention has been described in its preferred form with a degree of particularly, it is understood that the present disclosure of the preferred form has been made only by way of example and that numerous changes in the details of construction and the combination and arrangements of parts may be resorted to without departing from the scope of the invention.

The invention claimed is:

1. A reinforced structural material, comprising:

a reinforcement mesh including a plurality of pre-formed, rigid fiberglass rebars extending in a longitudinal or transverse direction and a plurality of supporting members, each supporting member formed from strands of glass fiber twisted together, the strands being parted at spaced locations thereby forming partings along their length by the rebars which extend through, and are secured at and fused with, the partings at the spaced locations, in a lattice arrangement, thereby forming an anchor point at each of the spaced locations, wherein the rebars and the strands are fused together at the partings at the spaced locations with a thermosettable adhesive mixture, the thermosettable adhesive mixture being in a state that maintains the mesh in a semi-flexible condition until cured, and wherein each anchor point consists of one of the plurality of rebars, one of the plurality of supporting members, and the thermosettable adhesive mixture; and a hardenable structural material of concrete or asphalt within which the reinforcement mesh is disposed for reinforcement.

2. The reinforced structural material of claim 1, wherein the rebars are treated to resist alkali attack.

3. The reinforced structural material of claim 2, wherein the glass fibers of the rebars are treated with a silane or coated with a rubber.

4. A method for producing a reinforced structural material, comprising the steps of:

producing a reinforcing mesh by providing a plurality of pre-formed, rigid fiberglass rebars extending longitudinally or transversely and arranged in a spaced-apart manner, providing a plurality of supporting members, each supporting member formed from strands of glass fiber extending across the rebars and arranged in a spaced-apart manner, twisting the strands of glass fiber so that partings between the strands are provided at predetermined locations along the length of each supporting member, guiding ones of the plurality of rebars through respective ones of the plurality of partings;

fusing the ones of the plurality of rebars to ones of the plurality of supporting members at the partings between the strands with a thermosettable adhesive mixture to form a reinforcement mesh, thus forming an anchor point, such that each anchor point consists of one of the plurality of rebars, one of the plurality of supporting members, and the thermosettable adhesive mixture, such that the fusing maintains the mesh in a semi-flexible state until cured; and placing the reinforcing mesh in a hardenable structural material of concrete or asphalt before hardening of the hardenable structural material and causing or allowing the hardenable structural material to harden or cure such that the reinforcing mesh reinforces the hardened structural material.

5. The reinforced structural material of claim 4, wherein the rebars are treated to resist alkali attack.

6. The reinforced structural material of claim 5, wherein the glass fibers of the rebars are treated with a silane or coated with a rubber.

7. A reinforced structural material, comprising:

a reinforcement mesh including a plurality of pre-formed, rigid fiberglass rebars extending in a longitudinal or transverse direction and a plurality of supporting members, each of the plurality of supporting members formed from strands of glass fiber twisted together, the strands being parted at spaced locations thereby forming partings along their length by the rebars which extend through, and are secured at and fused with, the partings at the spaced locations, in a lattice arrangement, thereby forming an anchor point at each of the spaced locations, wherein the strands of glass fiber traverse around ones of the plurality of rebars at the partings such that the parted strands of glass fiber are symmetrical with respect to one another around the ones of the plurality of rebars, wherein the ones of the plurality of rebars are fused together with the twisted strands at the partings at the spaced locations with a thermosettable adhesive mixture, the thermosettable adhesive mixture being in a state that maintains the mesh in a semi-flexible condition until cured, and wherein each anchor point consists of one of the plurality of rebars, one of the plurality of supporting members, and the thermosettable adhesive mixture; and a hardenable structural material of concrete or asphalt within which the reinforcement mesh is disposed for reinforcement.

* * * * *